United States Patent [19]

Martins et al.

[11] 4,097,445
[45] Jun. 27, 1978

[54] POLY(ESTER-AMIDE) HOT MELT ADHESIVES CONTAINING SPHEROIDAL METAL POWDERS

[75] Inventors: Joseph G. Martins, Ludlow; Donald D. Donermeyer, Springfield, both of Mass.

[73] Assignee: Monsanto Company, St. Louis, Mo.

[21] Appl. No.: 654,490

[22] Filed: Feb. 2, 1976

[51] Int. Cl.$^2$ .............................................. C08K 3/08
[52] U.S. Cl. .............................. 260/40 R; 260/37 M; 260/857 PE; 428/328
[58] Field of Search ............. 260/37 M, 857 PE, 40 R

[56] References Cited

U.S. PATENT DOCUMENTS

| 3,620,875 | 11/1971 | Guglielmo et al. | 260/37 M X |
|---|---|---|---|
| 3,650,999 | 3/1972 | Martins et al. | 260/857 PE X |
| 3,941,743 | 3/1976 | Skubon | 260/37 M X |

*Primary Examiner*—Sandra M. Person
*Attorney, Agent, or Firm*—R. Bruce Blance; William J. Farrington; James C. Logomasini

[57] ABSTRACT

Poly(ester-amide) adhesive compositions comprising a finely divided spheroidal metal. The poly(ester-amide) comprises crystalline polyester and amorphous polyamide segments formed by reaction of a $C_{18}$ to $C_{54}$ polycarboxylic acid mixture and a $C_2$ to $C_{10}$ aliphatic or alicyclic primary diamine. The finely divided spheroidal metal is selected from the group consisting of aluminum, iron, mild steel, stainless steel and zinc. The weight ratio of poly(ester-amide) to metal is in the range of 70:30 to 30:70. The adhesive compositions are useful as hot melt adhesives and cavity fillings.

20 Claims, No Drawings

POLY(ESTER-AMIDE) HOT MELT ADHESIVES CONTAINING SPHEROIDAL METAL POWDERS

BACKGROUND OF THE INVENTION

1. Field of the Invention

The present invention relates to a poly(ester-amide) hot melt adhesive composition, to a method of filling voids with the adhesive composition and to articles filled or coated with the hot melt adhesive composition. More particularly, it refers to a block copoly(ester-amide) filled with a finely divided metal powder, to a method of filling voids with such a composition and to articles, filled or coated with the composition.

2. Description of the Prior Art

Hot melt adhesives are well known in the prior art. These materials are conveniently applied to a substrate in the molten state and upon cooling form an adhesive bond. However, a deficiency common to most of the hot melt adhesives of the prior art is their tendency to soften and flow at elevated temperatures, as, for example, 70° to 100° C. with a resulting loss of bond strength. Consequently, these materials are not suitable for use over a broad temperature range.

Attempts to upgrade the softening and flow temperatures have involved using very high molecular weight resinous materials and/or crosslinking of the resin. These methods have resulted in materials with higher softening points and flow temperatures. However, in most cases the resulting material was not adapted to thermal processing because of its higher molecular weight and/or crosslinked structure resulting in extremely high application viscosity. Thus, these materials were not suitable for use as hot melt adhesives.

A definite need exists in the art for a hot melt adhesive which is resistant to flow at temperatures around 150° C. but which can be readily processed and applied using hot melt adhesive application techniques and apparatus.

U.S. Pat. No. 3,650,999 discloses a poly(ester-amide) resin having improved adhesion and high temperature performance obtained by reacting a crystalline polyester, a $C_{18}$ to $C_{54}$ polycarboxylic acid and a primary diamine. However, this poly(ester-amide) in common with other hot melt adhesives has deficiencies in creep resistance at temperatures above 150° C. in the range up to 205° C. and above and in shrinkage when the hot melt is cooled to room temperature after application.

A definite need therefore exists in the art for a hot melt adhesive which has improved creep resistance and shrink resistance without loss in processability and ease of application.

In the manufacture and repair of metal bodies such as automobiles and appliances, solder compositions containing lead are frequently used to fill cavities and voids. These lead solders are a health hazard which mandates special handling to protect workers and are also extremely dense. Conventional hot melt adhesives are not satisfactory for such cavity and void filling applications because they cannot be sanded rapidly at assembly line speed, they do not readily accept paint because they bleed through, and they do not withstand the curing temperatures for the paint. Curable adhesives such as epoxies are generally unsatisfactory because they require careful metering of the components to provide good physical properties and bond strength, and because they take too long to cure to a sandable state.

A need therefore exists for a cavity or void forming composition which is less dense and toxic than lead solder, forms a strong bond to metal substrate, withstands extremes of humidity and temperature, is readily applied and rapidly sets to a sandable state, is easily sanded smooth, and accepts paint without bleeding through.

SUMMARY OF THE INVENTION

The needs are met by the adhesive compositions of the present invention wherein a poly(ester-amide) having crystalline polyester segments and amorphous polyamide segments is filled with a finely divided spheroidal metal powder.

The adhesive composition comprises a. from about 70 to about 30 parts by weight of a poly(ester-amide) block copolymer melting in the range of about 155° to about 225° C., having from about 30 to about 70 percent by weight of crystalline polyester segments derived from at least one aliphatic or alicyclic diol having from 2 to 10 carbon atoms and at least one alicyclic or aromatic dicarboxylic acid having from 8 to 20 carbon atoms, and from about 70 to about 30 percent by weight of amorphous polyamide segments derived from an aliphatic polycarboxylic acid containing at least 40 weight percent of a $C_{18}$ to $C_{54}$ polycarboxylic acid and an aliphatic or alicyclic primary diamine containing 2 to 10 carbon atoms; and b. from about 30 to about 70 parts by weight of finely divided spheroidal metal powder selected from the group consisting of aluminum, iron, mild steel, stainless steel and zinc.

Another aspect of the invention is directed to substrates coated with the adhesive composition and yet another aspect is directed to a method of filling a cavity in a substrate which comprises applying the adhesive composition as a hot melt to fill the cavity, cooling the adhesive composition below its crystallization temperature and sanding the adhesive composition to provide a surface even with the surrounding substrate.

DESCRIPTION OF THE PREFERRED EMBODIMENTS

The poly(ester-amide) component of the present invention is prepared by reacting a crystalline polyester with an amorphous polyamide or with the component polycarboxylic acid and diamine by the one step or two step method set forth in U.S. Pat. No. 3,650,999 which patent is incorporated herein by reference.

The polyester reactant is considered to be a prepolymer in view of the fact that it copolymerizes with the other reactants to form a block copolymer. The polyester must be capable of contributing a crystalline structure to the resulting poly(ester-amide) as is evidenced by a crystalline melting point as determined by differential thermal analysis (DTA) and/or differential scanning calorimetry (DSC) methods. Moreover, the polyester should have a melting point higher than 180° C. and preferably in the range of from 200° to 270° C. and an inherent viscosity in the range of from 0.05 to 0.70 when measured as a 0.5 gram solution of polyester in 100 ml. of a 60/40 phenol/tetrachloroethane solvent pair at 25° C.

The present invention uses a polyester reactant that contributes crystalline blocks to the resulting poly(ester-amide) hot melt adhesive composition. Consequently, optimum bulk stage physical properties such as tensile and high modulus are achieved without occurring the disadvantage of a high processing viscosity.

An inherent viscosity of from 0.05 to 0.70 is required for the polyester in order to insure that the polyester will contribute the optimum crystalline structure to the final polymeric product. Polyesters with an intrinsic viscosity below 0.05 have a short chain length and cannot contribute the necessary crystalline structure to the final polymeric product which also comprises amorphous polyamide blocks. Inherent viscosities greater than about 0.70 require excessive reaction times or temperatures to form homogenous poly(ester-amides). Thus, it is impractical to use polyester reactants with intrinsic viscosities greater than 0.70 in the practice of the present invention. Moreover, excessive reaction times and temperatures tend to cause degradation of the polymer and a subsequent loss in adhesive properties.

The minimum melting point requirement of about 180° C. for the polyester reactant is necessary in order to insure that the final polymeric product has excellent thermal properties such as resistance to flow at elevated temperatures. Preferably, the melting point of the polyester is in the range of from 200° C. to 270° C.

Representative examples of high melting crystalline polyesters suitable for use in the present invention include polymeric ethylene terephthalate, neopentyl terephthalate, ethylene 2,6-naphthalate, tetramethylene terephthalate, tetramethylene 2,6-naphthalate, trimethylene 2,6-naphthalate, 1,4-cyclohexylene dimethylene terephthalate, and copolyesters, such as copolyesters of ethylene terephthalate containing at least 50 mol percent of ethylene terephthalate, such as 95/5, 90/10, 85/15 and 50/50 ethylene terephthalate-ethylene isophthalate copolyesters, ethylene terephthalate-ethylene adipate copolyesters, and ethylene terephthalate-ethylene hexahydroterephthalate copolyesters, tetramethylene terephthalate-tetramethylene azelate copolyesters containing at least 80 mol percent of tetramethylene terephthalate, 1,4-cyclohexylene dimethylene terephthalate-azelate copolyesters containing 70 to 90 mol percent of 1,4-cyclohexylene dimethylene terephthalate, copolyesters of ethylene 2,5- and 2,6-naphthalate containing from 80 to 90 mol percent of the ethylene naphthalate, such as ethylene 2,5-naphthalate-ethylene azelate and ethylene 2,6-naphthalate-ethylene azelate copolyesters. These polyester blocks can be derived from various dicarboxylic acids and various glycols. Representative examples of such acids are terephthalic acid, isophthalic acid, hexahydroterephthalic acid, the naphthalic acids, such as 2,6-, 2,7-, 2,8-, 1,5- and 1,4-naphthalene dicarboxylic acids and other such acids which form high melting polyester resins. Examples of glycols are ethylene glycol, propylene glycol, tetramethylene glycol, neopentyl glycol, 1,4-cyclohexane diol, 1,4-cyclohexane dimethanol and other such glycols. High melting polymers containing components such as 2,2-dimethyl propane diol, form polyesters which have melting points about 234° C. Mixtures of the foregoing polyesters can also be used.

Preferably, a polyester from the following group is used to prepare the polyesteramide component of the present invention:

Poly(ethylene terephthalate/isophthalate), 100/0 to 75/25;

Poly(ethyelne/hexamethylene terephthalate), 100/0 to 75/25;

Poly(ethylene/neopentyl terephthalate), 100/0 to 75/25;

Poly(tetramethylene terephthalate/isophthalate), 100/0 to 75/25;

Poly(tetramethylene/hexamethylene terephthalate), 100/0 to 75/25;

Poly(tetramethylene/neopentyl terephthalate), 100/0 to 75/25;

Poly(ethylene/propylene terephthalate), 100/0 to 60/40; and

Poly(tetramethylene - 2,6 - naphthalate/terephthalate), 100/0 to 75/25; etc.

The amide portion of the polyester-amide adhesive components of this invention are amorphous block segments which contribute wettability, elasticity and rubber character to the adhesive composition. The polyamide portion of the polyester-amide composition of the present invention is the reaction product of a $C_{18}$ to $C_{54}$ polycarboxylic acid and an aliphatic primary diamine. The polycarboxylic acids are well known in the art and are described in detail in U.S. Pat. No. 3,157,681 and other references. These materials are available commercially as mixtures of monobasic, dibasic and tribasic acid with the dibasic acid being present as the major component of the mixtures. These materials generally have a composition as follows:

| | Percent by Weight |
|---|---|
| $C_{18}$ monobasic acids (Monoacids) | 0 – 10 |
| $C_{36}$ dibasic acids (Dimer acids) | 80 – 100 |
| $C_{54}$ and higher polybasic acids (Trimer acids) | 0 – 10 |

The relative ratios of monomer, dimer and trimer in such unfractionated polymeric fat acids are dependent on the nature of the starting materials and the conditions of polymerization. For the purposes of this invention, the term polycarboxylic also includes mixtures of the mono, di and tribasic acids.

The aliphatic or alicyclic primary diamines used in this invention contain from 2 to 10 carbon atoms. These include ethylene diamine, 1,3-propane diamine, 1,4-butanediamine, 1,5-pentane diamine, hexamethylene diamine, 1,10-decanediamine, cyclohexyldiamine, 2,2-dimethyl-1,3-propane diamine, etc.

Optionally up to 60 percent by weight of a linear aliphatic dibasic acid having from 4 to 10 carbon atoms may be substituted for a corresponding amount of the $C_{18}$ to $C_{54}$ polycarboxylic acid used to prepare this portion of the polyesteramide. Examples of these acids would include oxalic, malonic, succinic, glutaric, adipic, pimelic, suberic, azelaic, and sebacic acids. The advantage of substituting the $C_4$ to $C_{10}$ acids for the $C_{18}$ to $C_{54}$ acids is to permit more heterogeneous character to the polyamide portion of the polymer in those applications where a more heterogeneous character is desired.

The poly(ester-amide) component of the present invention contains 30 to 70 percent by weight of polyamide segment and correspondingly, from 30 to 70 percent by weight of crystalline polyester segments. Preferably, it contains 40 to 60 percent by weight of polyamide segment and correspondingly, from 60 to 40 percent of crystalline polyester segments. The poly(ester-amides) are further characterized as having an inherent viscosity in the range of from 0.35 to 0.95 and more preferably from 0.40 to 0.6 when measured as a 0.5 gram solution of poly(ester-amide) in 100 ml. of a 60/40 phenol/tetrachloroethane solvent pair at 25° C. The crystalline melting point of these materials as measured by DTA or DSC is in the range of from 155° to 225° C. and the melt viscosity at 220° C. is in the range of from 5000 to 65,000 centipoises. The poly(ester-amide) resins are soluble in a 60/40 phenol/tetrachloroethane solvent pair and insoluble in a 1/1 toluene/isopropanol solvent pair. Moreover, the 1/1 toluene/isopropanol extractable content of the poly(ester-amide) resins is less than 2 percent. In view of the fact that the polyamide portion is soluble in toluene/isopropanol solvent pair the very low order of extractables for the poly(ester-amide) resins demonstrates that they are true block copolymers and not physical blends of polyester and polyamide segments.

The poly(ester-amide) is prepared by a one step or two step method. In the one step method the acid and amine components, which go to form the polyamide segment are polymerized in the presence of the crystalline polyester prepolymer. In the two step method the polyamide and polyester prepolymer segments are prepared separately and then reacted together to form the polyester-amide. These methods are discussed in greater detail in the working examples of U.S. Pat. No. 3,650,999.

The morphological properties of the poly(ester-amides) are determined on a duPont differential thermal analyzer Model DTA 900 using the differential scanning calorimeter attachment, with a 5 to 25 mg sample heated at a rate of 20° C. in a nitrogen atmosphere. The glass transition point ($T_g$) is the onset of the increase in specific heat of the polymer and is the intersection of the base line and the slope of increasing specific heat; the melting point ($T_m$) is the temperature observed at the apex of the melting endotherm peak.

The second component of the adhesive composition is a finely divided spheroidal metal powder selected from the group consisting of aluminum, iron, mild steel, stainless steel and zinc. The metal powder is substantially uniformly dispersed in the poly(ester-amide). It may be of number average particle size in the range of 0.2 micron to 150 micron and is preferably of number average particle size in the range of 4 to 100 micron. The preferred metal filler is atomized aluminum particularly when the adhesive composition is used for cavity filling since it allows the hot melt composition to be readily smoothed and burnished when it is sanded. In general, plate-like, acicular, or multi-faceted granular powdered metals are unsatisfactory, surprisingly causing high viscosity in the hot melt and "blinding" or filling and occlusion of sand paper when the filled composition is sanded.

The amount of metal powder which is dispersed in the poly(ester-amide) is sufficient to improve the high temperature creep resistance without causing unmanageable rheology. It is preferably in the range of about 30 to about 70 parts by weight of metal powder dispersed in about 70 to about 30 parts by weight of poly(ester-amide). The melt viscosity of the hot melt composition containing the metal filler is preferably less than about 150,000 centipoises at a temperature of 232° C. and a shear rate of 3–4 sec.$^{-1}$ measured in a Brookfield Thermocel Unit Model HBT. Above 150,000 centipoise melt viscosity, the hot melt is difficult to apply and spread, and tends to be dragged from the point of application.

Creep resistance of the filled poly(ester-amide) compositions of the present invention is determined by observing the sag of a 10 to 15 gram sample of the composition placed on an aluminum plane inclined at 60° to the vertical. The observations are carried out at 175° and 205° C. Creep or sag in less than 60 minutes at the designated temperature is recorded as a failure to meet the test.

Lap bond tensile strength is determined by ASTM Test Method D-1002-72. A minimum of 100 kg per sq. cm. is preferred.

Sandability of the filled compositions is determined by applying the composition as a hot melt to a smooth steel panel 7.5 × 22.5 cm. to provide a strip 4 cm. wide and in the range of 25 to 250 microns thick. The panel is cooled to room temperature and a disc sander, 12.5 cm. diameter, with 80 grit medium tungsten carbide abrasive, is applied to the composition at 1000 rpm to smooth and feather the composition. If the surface of the composition becomes smooth enough to accept paint without "telegraphing" or showing a difference in reflectivity between the painted steel and the painted composition, and without blinding or blocking the abrasive surface of the sander, the composition is rated sandable.

When the hot melt composition is formed by mixing the filler with the melted polymer, a good mix is considered to have been obtained if the filler particles are evenly distributed throughout the melt. In poor mixes, the filler particles are not adequately wet by the melt, and are not evenly distributed remaining aggregated within the melt. Melt stability of the mix is determined by maintaining the mix at 216° C. for 2 hours. If the melt viscosity changes less than ±10 percent during this time, the mix is considered to have melt stability.

In addition to improving the creep resistance of the poly(ester-amide) component, the metallic component improves the rate of melting of the adhesive composition, allows the composition to be applied and spread more easily with less pressure, imparts longer "open" time between application of the hot melt and closing of the bond and higher "green" strength or faster onset of bond strength, and reduces the degree of shrinkage of the adhesive composition when it is cooled from the hot melt temperature to ambient temperature. The cost of the composition is also considerably reduced. When the composition is used to fill cavities, it can be readily sanded as discussed above, withstands extremes of temperature and humidity, is exceptionally solvent resistant and is readily painted without abosrbing solvent, swelling, and blistering.

The hot melt adhesive compositions of the present invention find widespread utility wherever hot melt adhesives are used. They are especially valuable in those applications where resistance to creep at elevated temperatures is a necessary requirement. The adhesive compositions of the present invention may be used to great advantage to bond a variety of substrates including metal, glass, synthetic and natural textiles, leathers, synthetic polymeric sheet material, wood, paper, etc.

The present invention also includes the concept of incorporating various ingredients into the poly(ester-amide) resins of the present invention in order to improve processing and/or performance of these materials. These additives and adjuncts include antioxidants, thermal stabilizers, extenders, dyes, pigments, adhesion promoters, plasticizers, etc.

The following examples are set forth in illustration of this invention and should not be construed as a limitation thereof. Unless otherwise indicated, all parts and percentages are by weight.

EXAMPLE 1

A block copolymer which is approximately 60 percent by weight crystalline polyethylene terephthalate segments and 40 percent by weight amorphous polyamide made from dimer acid and hexamethylene diamine is prepared in two steps. In the first step 157.5 parts (0.272 mol) of a $C_{36}$ dibasic acid and 30.8 parts (0.266 mol) of 1,6-hexane diamine are charged to a reaction vessel and heated with agitation at about 215° C. for 1 hour to form a polyamide resin. During the first 30 minutes the pressure rises to 264 g/cm$^2$ after which time the reaction vessel is vented to reduce the pressure to 158 g/cm$^2$. At the end of 1 hour the pressure is released and 269 parts of a crystalline polyethylene terephthalate (M.P.=260° C./inherent viscosity 0.147) and 5.9 parts (0.095 mol) of ethylene glycol are charged to the vessel along with a minor amount of an antioxidant. The vessel is flushed with nitrogen and the mixture is heated to about 280° C. while maintaining a nitrogen pressure of 70 g/cm$^2$ After 0.5 hour the vessel is vented and vacuum applied and the reaction is continued under full vacuum (0.1 to 5 mm. of mercury) for 2 hours. At the end of this time the resulting molten poly(ester-amide) is discharged under pressure into a water bath to quench the material. The polymer obtained melts at 185° C. and the inherent viscosity is 0.50. To a stainless steel reactor fitted with an anchor agitator and a jacketed hot oil heating system is added 100 parts by weight of the poly(ester-amide) and heating is begun. When the contents have reached 250° C., agitation is begun at 60 rpm and 100 parts by weight dry aluminum powder (Alcoa Atomized Powder 123) is fed into the mass at a rate of 10 parts by weight per minute. The agitation is continued and the temperature raised to 266° C. under a nitrogen blanket. Agitation is continued for 15 minutes after the second addition is completed and the molten mass is discharged under slight $N_2$ pressure (70 g/cm$^2$) quenched in a bath, ground and redried. This material is used to as a hot melt to fill dents and orifices in large metal structures. After application it is cooled to room temperature, sanded smooth with 80 grit tungsten carbide abrasive and painted with an automotive topcoat. No "telegraphing" is observed.

EXAMPLE 2

Into a sigma-bladed mixer heated by a hot oil external jacket is placed 5.0 parts by weight poly(ester-amide) of Example 1. Heat is applied and at 216° C. agitation is begun. When the mass is molten, 5.0 parts by weight of aluminum powder of average particle size 15 to 19 microns, sold by the Aluminum Company of America under the tradename Alcoa Atomized Powder No. 123) is fed over a period of 10 minutes. After addition is completed, heating and agitation is continued for 15 minutes. At this point heating is stopped and under agitation cooling is begun. With agitation under cooling the molten mass becomes friable and breaks up into free flowing aggregate mixture ranging in size from 1/16 to ½ inch. This material is suitable for application as an adhesive or body filling compound when remelted.

EXAMPLE 3

A preblended mixture of 100 parts of the block copoly(ester-amide) of Example 1 and 100 parts of aluminum powder (Alcoa Powder No. 123) is fed from a hopper continuously into a Farrel Continuous Mixer whose temperature controls are set at 216° C. The mass is continously discharged (estimated hold up time 8–10 minutes) on a cooled conveyer belt and ground. Alternately the extruded ribbon is conveyed into a cooling bath, air blown, dried and ground in conventional grinding equipment. The free flowing aggregate is suitable for use as an adhesive and/or void filling compound when remelted and applied.

EXAMPLES 4–6

These examples show the effect of varying the filler content of the poly(ester-amide) adhesive composition. The poly(ester-amide) of Example 1 is blended in the manner set forth in Example 1, with 50, 150 and 200 parts of Alcoa Atomized Powder No. 123 per 100 parts of poly(ester-amide) respectively. The data are presented in Table 1.

TABLE 1

| | Block Copoly(ester-amide) Filled with Atomized Aluminum | | | | | |
|---|---|---|---|---|---|---|
| Ex. | Filler Parts per 100 parts Poly(ester-amide) | Melt Viscosity $10^{-5}$ cps, 4 sec$^{-1}$ | Melt Stability | Creep Resistance | | Sandability |
| | | | | 175° C | 205° C | |
| 1 | 100 | 35 | Stable | Pass | Pass | Pass |
| 4 | 50 | 28 | Stable | Pass | Pass | Marginal |
| 5 | 150 | 56 | Stable | Pass | Pass | Pass |
| 6 | 200 | >100 | Stable | Pass | Pass | Pass |
| 0 | 0 | 20 | Stable | Fail | Fail | Fail |

EXAMPLES 7–8

In these examples, copoly(ester-amide) filled with flake aluminum is prepared and compared with copoly(ester-amide) filled with atomized aluminum. The poly(ester-amide) of Example 1 is blended with filler in the manner set forth in Example 1. The data are presented in Table 2. The flake aluminums of Examples 7 and 8 are produced by Reynolds and sold under the tradenames IF75 Flake Aluminum 40XD and 3XD respectively and have average particle sizes less than 44 microns. Extremely high melt viscosity is obtained even at low concentrations of filler.

TABLE 2

| | Comparison of Block Copoly(ester-amide) Filled with Atomized and Flake Aluminum | | | | | | |
|---|---|---|---|---|---|---|---|
| Example | Filler | Filler: Poly(ester-amide) Weight Ratio | Melt Viscosity $10^{-3}$ cps, 4 sec$^{-1}$ | Melt Stability | Creep Resistance | | Sandability |
| | | | | | 175° C. | 205° C. | |
| 1 | Atomized Aluminum | 1:1 | 35 | Stable | Pass | Pass | Pass |
| 4 | Atomized Aluminum | 1:2 | 28 | Stable | Pass | Pass | Pass |
| 7 | Flake Aluminum | 1:2 | >300 | Stable | Pass | Pass | Blinds |
| 8 | Flake | 1:4 | >300 | Stable | Pass | Pass | Blinds |

TABLE 2-continued

Comparison of Block Copoly(ester-amide) Filled with Atomized and Flake Aluminum

| Example | Filler | Filler: Poly(ester-amide) Weight Ratio | Melt Viscosity $10^{-3}$ cps, 4 sec$^{-1}$ | Melt Stability | Creep Resistance 175° C. | Creep Resistance 205° C. | Sandability |
|---|---|---|---|---|---|---|---|
|  | Aluminum |  |  |  |  |  |  |

EXAMPLES 9–16

These examples set forth a comparison between copoly(ester-amide) filled with inorganic mineral pigments and with atomized aluminum. The poly(ester-amide) of Example 1 is blended with filler in the manner set forth in Example 1. The data are presented in Table 3. In general the inorganic fillers tend to be incompatible, to give high viscosity, poor mix stability and poor sandability. Barium sulfate demonstrates a further disadvantage, namely instability at the hot melt mixing temperature and evolution of acrid fumes of sulfur trioxide. The oleophilic clay of Examples 9 and 10 is supplied by Georgia Kaolin Company under the Tradename Kaogan 45.

TABLE 3

COMPARISON OF INORGANIC MINERAL PIGMENTS WITH ATOMIZED ALUMINUM

| Example | Filler | Filler: Poly(ester-amide) Weight Ratio | Melt Viscosity $10^{-3}$ cps, 4 sec$^{-1}$ | Melt Stability | Creep Resistance 175° C. | Creep Resistance 205° C. | Sandability |
|---|---|---|---|---|---|---|---|
| 1 | atomized aluminum | 1:1 | 35 | Stable | Pass | Pass | Pass |
| 4 | atomized aluminum | 1:2 | 28 | Stable | Pass | Pass | Pass |
| 9 | oleophilic clay | 1:1 | >300 | Poor | Pass | — | Blinds |
| 10 | oleophilic clay | 1:2 | 100 | Poor | Pass | — | Blinds |
| 11 | calcium carbonate | 1:1 | Incompatible | Poor mix | Pass | — | — |
| 12 | calcium carbonate | 1:2 | Incompatible mix | Poor | — | — | — |
| 13 | titanium dioxide | 1:1 | >300 | Poor mix | — | — | — |
| 14 | titanium dioxide | 1:2 | 25 | — | Fail | Fail | Pass |
| 15 | barium sulfate | 1:1 | 55 | Very poor acrid fumes | Pass | Pass | Pass |
| 16 | barium sulfate | 1:2 | 40 | Very poor acrid fumes | Pass | Fail | Pass |

EXAMPLES 17–25

These examples are prepared by filling commercially available polyester and polyamide hot melt adhesives with atomized aluminum powder (Alcoa Atomized Powder No. 123) in the manner set forth in Example 1. The data are presented in Table 4. The weight ratio of polymer to filler is 1:1. The data show that compositions containing commercial polyesters and polyamides generally fail the creep test and the sandability test and that those which marginally pass the sandability test and the creep test are of such high viscosity that they are difficult to apply.

TABLE 4

Comparison Of Filled Block Copoly(Ester-Amide) With Filled Polyesters And Polyamides

| EXAMPLE | POLYMER | MELT VISCOSITY $10^{-3}$ cps, 4 sec$^{-1}$ | CREEP RESISTANCE 175° C. | CREEP RESISTANCE 205° C. | SANDABILITY | LAP BOND TENSILE STRENGTH kg/cm$^2$ |
|---|---|---|---|---|---|---|
| 1 | block copoly(ester-amide) | 35.0 | pass | pass | pass | 197 |
| 17 | Polyester A | 35.5 | fail | fail | blinds | 211 |
| 18 | Polyester B | 132.4 | pass | fail | pass | 106 |
| 19 | Polyester C | 17.5 | fail | fail | blinds | 134 |
| 20 | Polyester D | >500 | pass | fail | marginal | 106 |
| 21 | Polyamide A | 22 | fail | fail | blinds | 78 |
| 22 | Polyamide B | 28 | fail | fail | blinds | 120 |
| 23 | Polyamide C | 6.0 | fail | fail | blinds | 134 |
| 24 | Polyamide D | 135.0 | fail | fail | blinds | 78 |
| 25 | Polyamide E | >300 | pass | pass | marginal | 183 |

What is claimed is:
1. An adhesive composition comprising:
   a. from about 60 to about 30 parts by weight of a poly-(ester-amide) block copolymer melting in the range of about 155° to about 225° C. having from about 30 to about 70 percent by weight of crystalline polyester segments derived from at least one aliphatic or alicyclic diol having from 2 to 10 carbon atoms and at least one alicyclic or aromatic dicarboxylic acid having from 8 to 20 carbon atoms, and from about 70 to about 30 percent by weight of amorphous polyamide segments derived from an aliphatic polycarboxylic acid containing at least 40 weight percent of a $C_{18}$ to $C_{54}$ polycarboxylic acid and an aliphatic or alicyclic primary diamine containing 2 to 10 carbon atoms; and b. from about 40 to about 60 parts by weight of finely divided spheroidal metal powder selected from the group consisting of aluminum, iron, mild steel, stainless steel and zinc of particle size in the range of about 0.2 to about 150 microns.

2. The adhesive composition of claim 1 wherein the polyester is selected from the group consisting of poly(ethylene-terephthalate), co-poly(butylene terephthalate)-(ethylene terephthalate), co-poly(ethylene-terephthalate)-(ethyleneisophthalate) and copoly(ethylene terephthalate)-(propylene terephthalate).

3. The adhesive composition of claim 1 wherein the diamine is hexamethylene diamine.

4. The adhesive composition of claim 1 having a melt viscosity at 232° C. of less than about 150,000 centipoise at a shear rate of 4 sec.$^{-1}$.

5. The adhesive composition of claim 1 wherein the polyester segment prior to incorporation in the polyesteramide has an inherent viscosity at 25° C. in the range of about 0.05 to about 0.70 measured as a 0.5 gram solution in 100 ml. of a solvent mixture of 60 parts by weight of phenol and 40 parts by weight of symm-tetrachloroethane and a melting point in the range of about 180° to about 270° C.

6. The adhesive composition of claim 1 wherein the poly(ester-amide) has an inherent viscosity at 25° C. in the range of from 0.35 to about 0.95 measured as a 0.5 gram solution in 100 ml. of a solvent mixture of 60 parts by weight of phenol and 40 parts by weight of symm-tetrachloroethane.

7. The adhesive composition of claim 1 wherein the spheroidal metal powder has a particle size in the range of about 4 to about 100 microns.

8. An adhesive composition comprising:
   a. from about 70 to about 30 parts by weight of a poly(ester-amide) block copolymer of inherent viscosity in the range of about 0.35 to about 0.95 and of melting point in the range of about 155° to about 225° C., having from about 30 to about 70 percent by weight of crystalline polyester segments selected from the group consisting of poly(ethylene-terephthalate), co-poly (butylene terephthalate)-(ethylene terephthalate), co-poly(ethylene-terephthalate)-(ethylene isophthalate) and co-poly(ethylene terephthalate)-(propylene terephthalate) which prior to incorporation in the poly(ester-amide), have an inherent viscosity in the range of about 0.05 to about 0.70 and a melting point in the range of about 180° to about 270° C., and from about 70 to about 30 percent by weight of amorphous polyamide segments derived from a $C_{36}$ dibasic acid and an aliphatic or alicyclic diamine containing from 2 to 10 carbon atoms, the inherent viscosities being determined at 25° C. with an 0.5 gram solution in 100 ml. of a solvent mixture of 60 parts by weight of phenol and 40 parts by weight of symm-tetrachloroethane; and
   b. from about 30 to about 70 parts by weight of spheroidal aluminum powder of particle size in the range of about 4 to about 100 microns.

9. The adhesive composition of claim 8 wherein the diamine is hexamethylene diamine.

10. The adhesive composition of claim 8 having a melt viscosity at 232° C. of less than about 150,000 centipoise at a shear rate of 4 sec.$^{-1}$.

11. A substrate coated with an adhesive composition wherein the adhesive composition comprises:
   a. from about 60 to about 30 parts by weight of a poly(ester-amide) block copolymer melting in the range of about 155° to about 225° C. having from about 30 to about 70 percent by weight of crystalline polyester segments derived from at least one aliphatic or alicyclic diol having from 2 to 10 carbon atoms and at least one alicyclic or aromatic dicarboxylic acid having from 8 to 20 carbon atoms, and from about 70 to about 30 percent by weight of amorphous polyamide segments derived from an aliphatic polycarboxylic acid containing at least 40 weight percent of a $C_{18}$ to $C_{54}$ polycarboxylic acid and an aliphatic or alicyclic primary diamine containing 2 to 10 carbon atoms; and
   b. from about 40 to about 60 parts by weight of finely divided spheroidal metal powder selected from the group consisting of aluminum, iron, mild steel, stainless steel and zinc of particle size in the range of about 0.2 to about 150 microns.

12. The substrate of claim 11 wherein the polyester block of the poly(ester-amide) is selected from the group consisting of poly(ethylene-terephthalate), co-poly(butylene terephthalate)-(ethylene terephthalate), co-poly(ethylene-terephthalate)-(ethylene isophthalate) and co-poly(ethylene terephthalate)-(propylene terephthalate).

13. The substrate of claim 11 wherein the diamine of the amide block of the poly(ester-amide) is hexamethylene diamine.

14. The substrate of claim 11 wherein the melt viscosity of the adhesive composition at 232° C. is less than about 150,000 centipoise at a shear rate of 4 sec.$^{-1}$.

15. The substrate of claim 11 wherein the polyester segment prior to incorporation in the poly(ester-amide) has an inherent viscosity at 25° C. in the range of about 0.05 to about 0.70 measured as an 0.5 gram solution in 100 ml. of a solvent mixture of 60 parts by weight of phenol and 40 parts by weight of symm-tetrachloroethane and a melting point in the range of about 180° to about 270° C.

16. The substrate of claim 11 wherein the poly(ester-amide) has an inherent viscosity at 25° C. in the range of from 0.35 to about 0.95 measured as an 0.5 gram solution in 100 ml. of a solvent mixture of 60 parts by weight of phenol and 40 parts by weight of symm-tetrachloroethane.

17. The substrate of claim 11 wherein the spheroidal metal powder has a particle size in the range of about 4 to about 100 microns.

18. A substrate coated with an adhesive composition wherein the adhesive composition comprises:
   a. from about 70 to about 30 parts by weight of a poly(ester-amide) block copolymer of inherent viscosity in the range of about 0.35 to about 0.95 and of melting point in the range of about 155° to about 225° C., having from about 30 to about 70 percent by weight of crystalline polyester segments selected from the group consisting of poly(ethylene-terephthalate), co-poly (butylene terephthalate)-(ethylene terephthalate, co-poly(ethylene-terephthalate)-(ethylene isophthalate) and co-poly(ethylene terephthalate)-(propylene terephthalate) which prior to incorporation in the poly(ester-amide), have an inherent viscosity in the range of about 0.05 to about 0.70 and a melting point in the range of about 180° to about 270° C., and from about 70 to about 30 percent by weight of amorphous polyamide segments derived from a $C_{36}$ dibasic acid and an aliphatic or alicyclic diamine containing from 2 to 10 carbon atoms, the inherent viscosities being determined at 25° C. with an 0.5 gram solution in 100 ml. of a solvent mixture of 60 parts by weight of phenol and 40 parts by weight of symm-tetrachloroethane; and b. from about 30 to about 70 parts by weight of spheroidal aluminum powder of particle size in the range of about 4 to about 100 microns.

19. The substrate of claim 18 wherein the diamine of the amide block of the poly(ester-amide) is hexamethylene diamine.

20. The substrate of claim 18 wherein the melt viscosity of the adhesive composition at 232° C. is less than about 150,000 centipoise at a shear rate of 4 sec.$^{-1}$.

* * * * *